2 Sheets—Sheet 1.
J. H. CONNELLY & J. McLURE.
COLLECTING, SEPARATING, AND PURIFYING THE GASES FROM FURNACES.
No. 103,572.   Patented May 31, 1870.
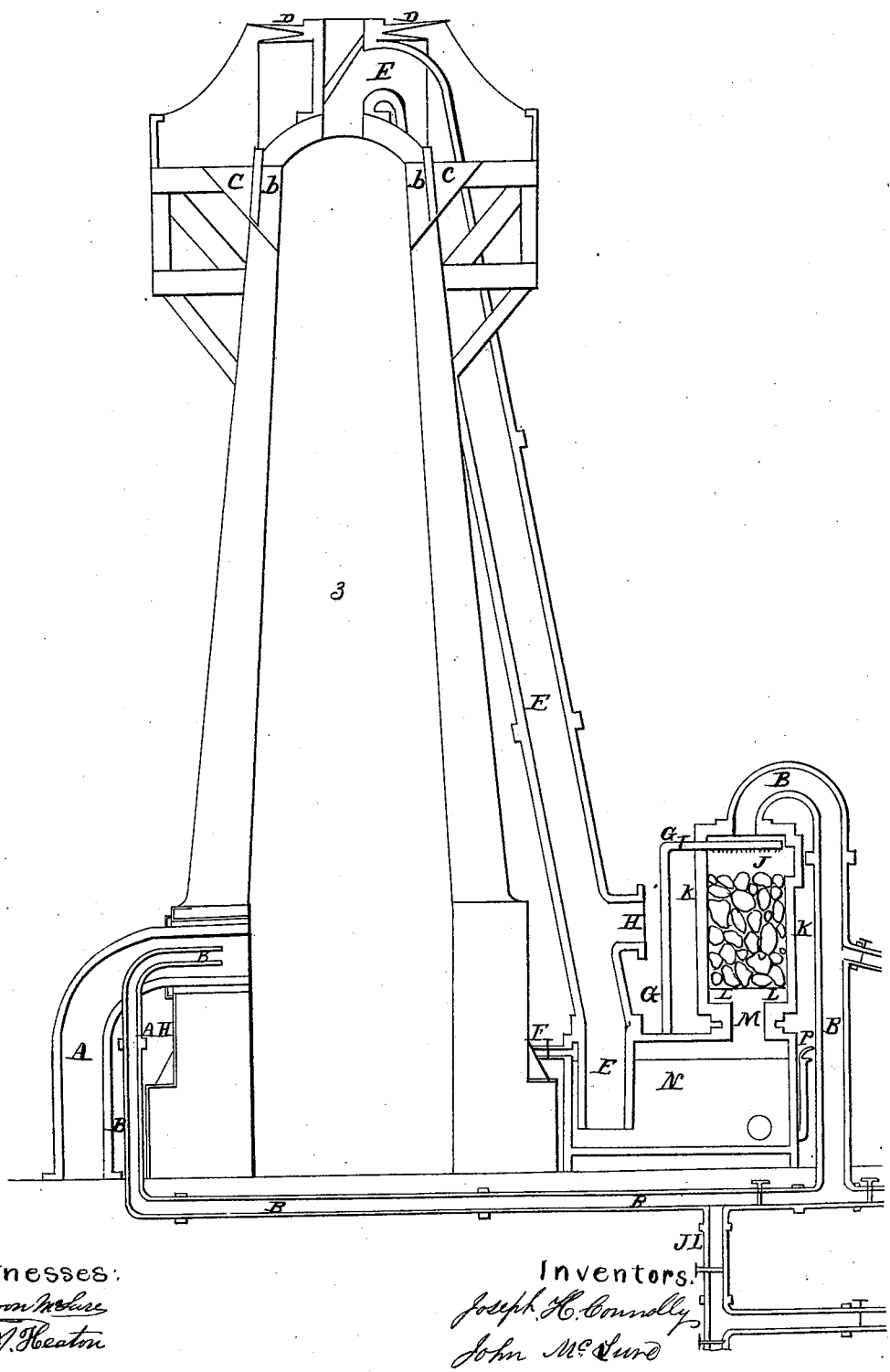
Witnesses:
J. Boon McLure
S. A. Heaton
Inventors:
Joseph H. Connelly
John McLure 2 Sheets—Sheet 2.
J. H. CONNELLY & J. McLURE.
COLLECTING, SEPARATING, AND PURIFYING THE GASES FROM FURNACES.
No. 103,572. Patented May 31, 1870.
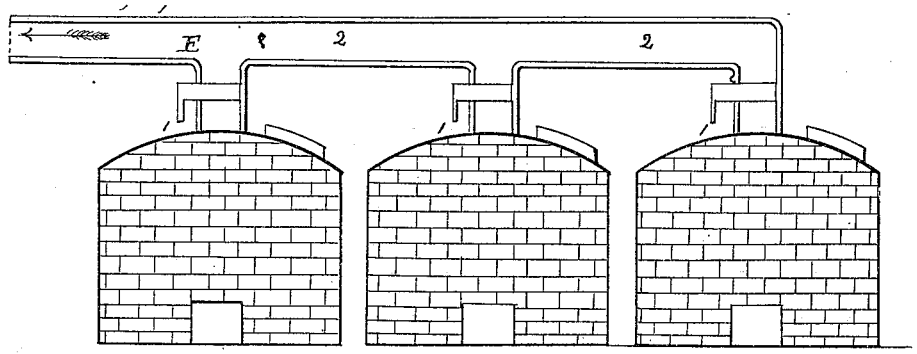
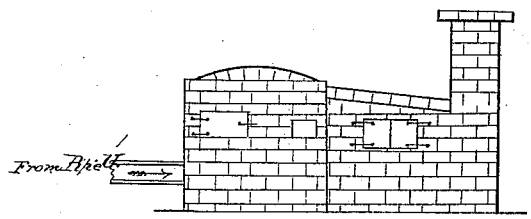
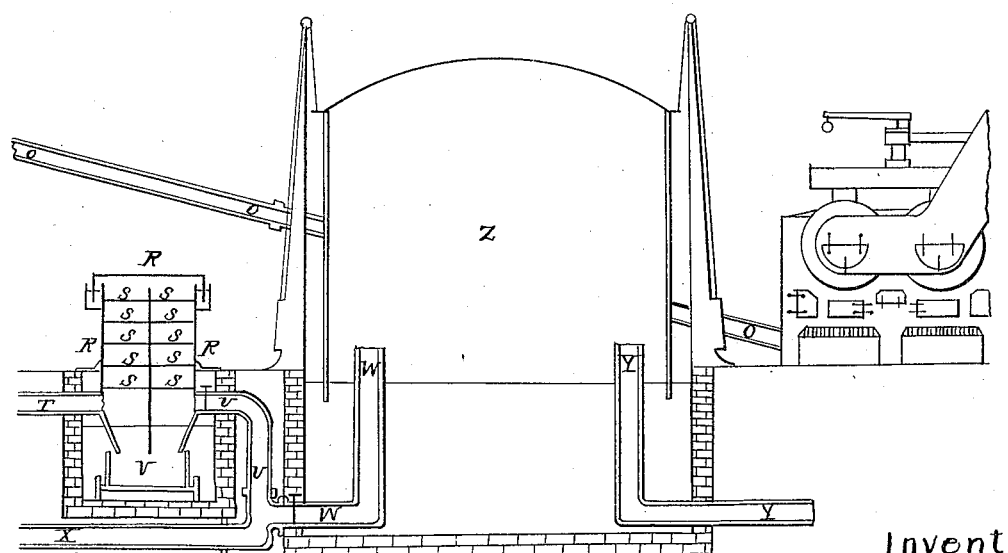
Witnesses:
J. Boon McLure
S. A. Heaton
Inventors.
Joseph H. Connelly
John McLure

United States Patent Office.

JOSEPH H. CONNELLY AND JOHN McLURE, OF WHEELING, WEST VIRGINIA.

Letters Patent No. 103,572, dated May 31, 1870.

IMPROVEMENT IN COLLECTING, SEPARATING, AND PURIFYING THE GASES FROM FURNACES.

The Schedule referred to in these Letters Patent and making part of the same.

We, JOSEPH H. CONNELLY and JOHN McLURE, of Wheeling, in the county of Ohio and State of West Virginia, have invented a certain Process for Collecting the Mixed Gases and substances passing off from Furnaces and Coke-ovens, wherein bituminous coal is used, separating and purifying the hydrocarbon gas therein contained from said substances, and other gases, and applying the same to aid the combustion in said furnaces, and also in puddling furnaces, and also preparing it for illuminating purposes, of which the following is a specification, reference being had to the annexed drawing.

Our invention relates to the process of collecting the mixed gases and substances passing off from furnaces, stacks or cupolas, and coke-ovens wherein bituminous coal is being used, separating said gases from said substances, and conveying through pipes said gases, or the hydrocarbon alone after being separated from the others, to the fires in the furnaces to aid in their combustion; and also preparing the hydro-carbon gas for illuminating purposes, by sufficiently enriching it by the addition thereto of cannel coal, or oil-gas, thereby utilizing said gases, or a part of them.

The drawing presents sectional views of the different machines or apparatus used.

As shown by the drawing, we accomplish the above by inclosing the top of the furnace or cupola, and insert therein the pipe E.

A similar pipe, 2, is also inserted in the top of the coke-ovens, through which pipe the gases and substances are drawn off from the furnace and coke-ovens by means of an exhaust-pump or fan connected therewith at H, which exhaust is not shown in the drawing because of the difficulty of so doing, but such an apparatus is well known to all manufacturers of gas; which exhaust also forces the said gases and substances into the water-condenser N, wherein the substances, such as tar, &c., thereof are separated from the gases; thence forces the gases into and through the scrubber or washer K, which further separates the substances from the gases; the substances, such as tar, returning back into the condenser from which the tar, &c., passes off from it through bent pipe P; thence forces said gases through the pipes B and O into either the furnace or boiler, fire, or to both, to aid in the combustion thereof; or the same may be still further forced through the lime or other purifier V, as hereinafter more fully shown, before being conveyed to the furnace or cupola fire.

To prepare from said gases an illuminating gas, we still further force and pass them through the lime or other purifier V, which separates the hydro-carbon gas therein contained from the others, as well as from other impurities, from which the hydrocarbon gas obtained is forced and conveyed through the pipe W into the gas-holder Z, wherein it is sufficiently enriched for illuminating purposes by the addition thereto of cannel coal or oil-gas through the pipe X, and from which holder it is taken to be condensed.

As we do not confine ourselves to any particular constructed furnace or coke-ovens or apparatus for manufacturing gas, and each and all of them being so well known to those skilled in the matters to which they relate, we deem it unnecessary to particularly describe them further than above done and shown in the drawing. But, having inclosed the top of the furnace or cupola, as before stated, to provide for supplying the furnace or cupola with coal, metal, lime, &c., we construct two or more hoppers C, to, around, or about, and near its top, said hoppers having their bottoms considerably inclined toward the furnace and opening thereinto by means of sliding doors, raised and lowered by levers attached thereto, and to the furnace or frames of hoppers. So to charge the furnace, fill said hoppers, and raise said doors, when they will simultaneously discharge themselves.

The construction and operation of said hoppers we claim as our invention.

To provide for the escape of said gases and substances when for any reason it is not desired to appropriate them for the purposes herein described, we have a raising door made either in the top of cover of the top of the furnace, or in the pipe E near where it enters the furnace.

We do not claim as new of themselves the parts or pieces of machinery or apparatus herein described, but only such combinations thereof as hereinafter set forth.

The dimensions and capacities of the pipe E, exhaust H, condenser N, scrubber K, purifier V, holder Z, and their connecting and discharging pipes will be determined by the amount of gases and substances to be thus utilized, which can be readily done by those conversant with the matter to which this relates.

We claim that this application of said gases and substances will effect a saving of what is now lost, thereby economizing fuel, improving the quality of iron, saving the tar, and aid in providing an illuminating gas.

What we claim as our invention, and desire to secure by Letters Patent, is

1. The process of applying the gases and substances which pass off from furnaces, cupolas, stacks, and coke-ovens, by drawing or conveying them off by the means substantially as herein described, separating said substances from said gases, substantially as herein described, and then applying said gases or the hydrocarbon gas obtained, by the means substantially as herein described, to aid and assist the combustion in the fires of furnaces, substantially as herein described, and also further preparing said hydrocarbon gas for illuminating gas, as herein described.

2. The pipe E in combination with the exhaust H, substantially as herein described, and for the purpose specified.

3. The furnace 3, coke-ovens 1, in combination with the pipe E, condenser H, scrubber K, purifier V, and holder Z, substantially as and for the purpose set forth.

4. Hoppers C C, constructed and arranged substantially as and for the purpose set forth.

JOSEPH H. CONNELLY.
JOHN McLURE.

Witnesses:
   J. BOON McLURE,
   HIRAM YOUNG.